(12) United States Patent
Yamada

(10) Patent No.: US 9,529,445 B2
(45) Date of Patent: *Dec. 27, 2016

(54) INPUT DEVICE AND INPUT METHOD

(71) Applicant: FUJITSU LIMITED, Kawasaki-shi, Kanagawa (JP)

(72) Inventor: Moyuru Yamada, Machida (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/561,965

(22) Filed: Dec. 5, 2014

(65) Prior Publication Data

US 2015/0193003 A1    Jul. 9, 2015

(30) Foreign Application Priority Data

Jan. 8, 2014    (JP) ................. 2014-001987

(51) Int. Cl.
*G06F 3/01* (2006.01)
*A63F 13/211* (2014.01)
(Continued)

(52) U.S. Cl.
CPC ............. *G06F 3/017* (2013.01); *A63F 13/211* (2014.09); *A63F 13/212* (2014.09); *G06F 1/163* (2013.01);
(Continued)

(58) Field of Classification Search
CPC .......... G06F 3/017; G06F 3/013; G06F 3/011; G06F 3/016; G06F 3/0346; G06F 3/012; G06F 3/0304; G06F 1/163
See application file for complete search history.

(56) References Cited

U.S. PATENT DOCUMENTS 3,545,266 A * 12/1970 Wilson ................... G01C 21/16
 701/123
5,645,077 A *  7/1997 Foxlin ................... A61B 5/1114
 600/587
(Continued)

FOREIGN PATENT DOCUMENTS

JP    2010-534895    11/2010
JP    2012-242901    12/2012
(Continued)

OTHER PUBLICATIONS

USPTO, Non-Final Rejection mailed Feb. 16, 2016, in related U.S. Appl. No. 14/559,018 [pending].

*Primary Examiner* — Olga Merkoulova
(74) *Attorney, Agent, or Firm* — Fujitsu Patent Center

(57) ABSTRACT

A device that is worn on a portion of a user's body and inputs a command into a controller, includes a sensor that obtains angular velocities and an acceleration in a first coordinate system fixed in the input device, a processor that performs setting a second coordinate system for a reference posture of the user, calculating a rotation matrix that converts the angular velocities in the first coordinate system into angular velocities in the second coordinate system using the acceleration in the first coordinate system, calculating feature amounts in the second coordinate system using the angular velocities in the second coordinate system, and specifying the command using the feature amounts, and a transmitter that transmits the command to the controller.

12 Claims, 27 Drawing Sheets

(51) Int. Cl.
*A63F 13/212* (2014.01)
*G06F 1/16* (2006.01)
*G06F 3/038* (2013.01)
*G06F 3/0346* (2013.01)

(52) U.S. Cl.
CPC .............. *G06F 3/011* (2013.01); *G06F 3/012* (2013.01); *G06F 3/038* (2013.01); *G06F 3/0346* (2013.01)

(56) References Cited

U.S. PATENT DOCUMENTS

| | | | |
|---|---|---|---|
| 2009/0027337 A1 | 1/2009 | Hildreth | |
| 2009/0031240 A1 | 1/2009 | Hildreth | |
| 2009/0295722 A1* | 12/2009 | Yamamoto | G06F 3/0346 345/158 |
| 2012/0272194 A1* | 10/2012 | Yang | G06F 3/017 715/863 |
| 2012/0302345 A1* | 11/2012 | Shikata | A63F 13/06 463/36 |
| 2013/0023341 A1 | 1/2013 | Yamanouchi | |
| 2013/0190908 A1 | 7/2013 | Ellis | |
| 2014/0118249 A1 | 5/2014 | Hildreth | |
| 2014/0282270 A1* | 9/2014 | Slonneger | G06F 3/017 715/863 |
| 2015/0185765 A1 | 7/2015 | Peek et al. | |
| 2015/0297437 A1 | 10/2015 | Neuenhahn et al. | |

FOREIGN PATENT DOCUMENTS

| | | |
|---|---|---|
| WO | 2009008372 | 1/2009 |
| WO | 2009018161 | 2/2009 |
| WO | 2011-122214 | 10/2011 |

* cited by examiner

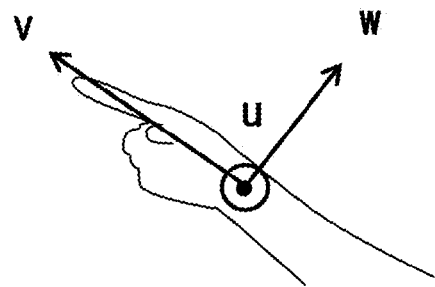
$\theta \cong \pm 90, \psi = +90$ [deg]
F I G. 8

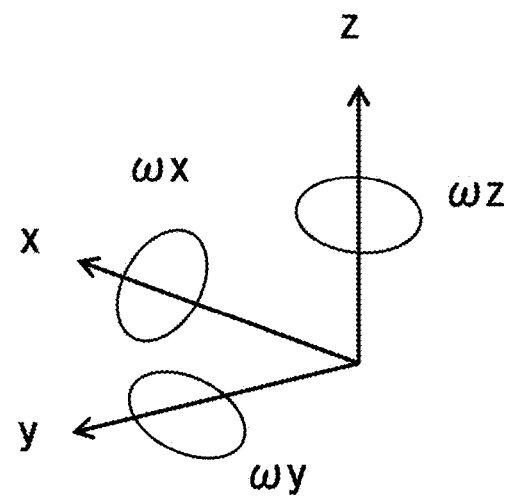
F I G. 9

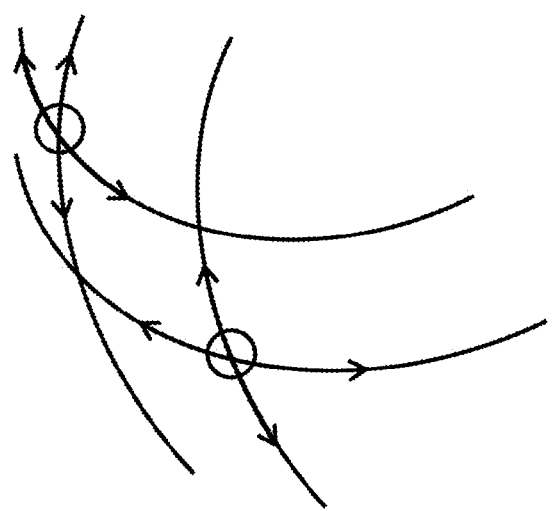
F I G. 14

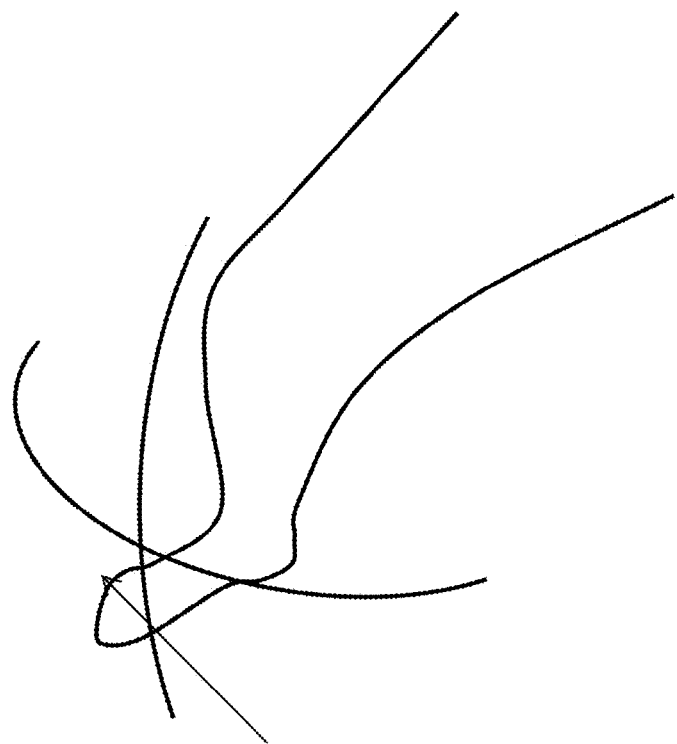
WITH ANKLE AS CENTER
F I G. 1 5

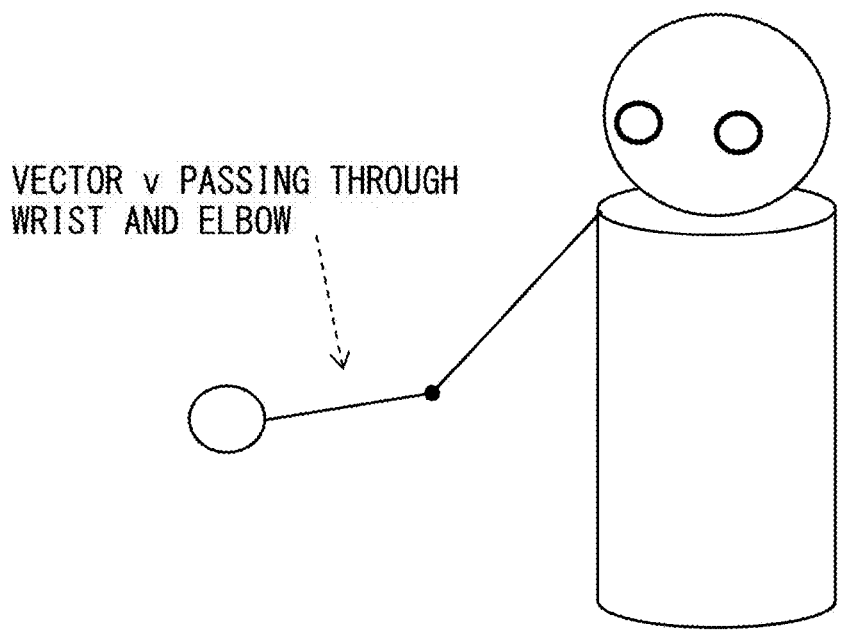
F I G. 17

INPUT DEVICE AND INPUT METHOD

CROSS-REFERENCE TO RELATED APPLICATION

This application is based upon and claims the benefit of priority of the prior Japanese Patent Application No. 2014-001987, filed on Jan. 8, 2014, the entire contents of which are incorporated herein by reference.

FIELD

The embodiments discussed herein are related to an input device, an input method, and an input program.

BACKGROUND

In order to operate a terminal using a touch panel, a user faces a screen on which output of the terminal is displayed, and operates the terminal by operating a keyboard or a mouse, or by touching the screen with one or more fingers. In other words, the user needs to directly touch the touch panel for the input into the terminal using the touch panel, and it is impossible for the user to operate the terminal from a free position of his or her hand or a free posture.

In view of this, a method has been developed for operating a portable terminal or peripheral equipment using the movement of an upper limb, while wearing on one's body or holding in a hand a device that can measure an acceleration or an angular velocity.

As the technology described above, a device is known that detects an angle corresponding to a change in orientation of a directional vector of a hand and a forearm of a user from an image obtained by capturing a user's movement, and that determines whether a motion to turn pages has been made (for example, Patent Document 1). In this technology, a user does not need to learn operations of a device for input, and can cause the device to perform corresponding control by merely making an ordinary motion for turning pages.

In addition, a technology is known in which a position of a user's hand is photographed, the position is expressed by a relative distance and a relative angle from a prescribed point, such as a center position of the user's chest, and the relative position and the relative angle are associated with a position of a cursor of an input device (for example, Patent Document 2). This technology enables easy selection of an item from a group of items, such as the selection of a letter from a group of alphabetic letters, or the selection of a function from a plurality of functions.

In addition, a technology is known in which a user executes a game while holding a controller that is an operation device of a game machine, and resets a reference posture of the controller by pressing a button of the controller (for example, Patent Document 3). In this technology, the controller incorporates an angular velocity sensor, and outputs, to the game machine, a detection signal of an angular velocity detected by the angular velocity sensor. The detection signal of the angular velocity sensor is a signal that is obtained by detecting an angular velocity at which the controller is rotated around each of the coordinate axes of a three-dimensional orthogonal coordinate system that is set in the controller. The game machine detects, from the detection signal, rotation angles from a reference posture of the controller, and performs control on the basis of a change in the rotation angle. This technology prevents, for example, a situation in which errors due to drift of the angular velocity sensor are accumulated in an integrated value of angular velocities, the detected rotation angles become inaccurate over time, and it becomes impossible to appropriately control the movement of characters or objects that are displayed on a display of the game machine.

Patent Document 1: Japanese Laid-open Patent Publication No. 2012-242901

Patent Document 2: Japanese National Publication of International Patent Application No. 2010-534895

Patent Document 3: International Publication Pamphlet No. 2011/122214

SUMMARY

According to an aspect of the embodiments, an input device that is worn on a portion of a user's body and inputs a command into a controller, includes a sensor that obtains an angular velocities and an acceleration in a first coordinate system fixed in the input device, a processor that performs setting a second coordinate system for a reference posture of the user, calculating a rotation matrix that converts the angular velocities in the first coordinate system into an angular velocities in the second coordinate system using the acceleration in the first coordinate system, calculating feature amounts in the second coordinate system using the angular velocities in the second coordinate system, and specifying the command using the feature amounts, and a transmitter that transmits the command to the controller.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 8 illustrates an example of the setting of an Euler angle $\psi$.

FIG. 9 is a diagram explaining rotation matrix elements $\omega x$, $\omega y$, and $\omega z$.

FIG. 14 illustrates a motion of FIG. 13 in an orthogonal coordinate system in a reference posture.

FIG. 15 illustrates an example of a coordinate system that is set in an ankle.

FIG. 17 illustrates a vector passing through a wrist and an elbow as an example of an auxiliary feature amount.

DESCRIPTION OF EMBODIMENTS

In a technology for detecting a position or a posture of a tip of a part that starts a body motion, such as a hand, a toe, or a head, so as to perform input, for example, a user's sense of direction deviates from corresponding operations, and this gives an uncomfortable feeling to the user and is likely to impose great labor for learning operations on the user. In addition, in a method for calculating a posture angle on the basis of an acceleration during a motion, an error due to noise, for example, is likely to occur.

With reference to drawings, described below are a wearable input device, an input method, and an input program according to an embodiment.

<Input Device>

Figure 1:
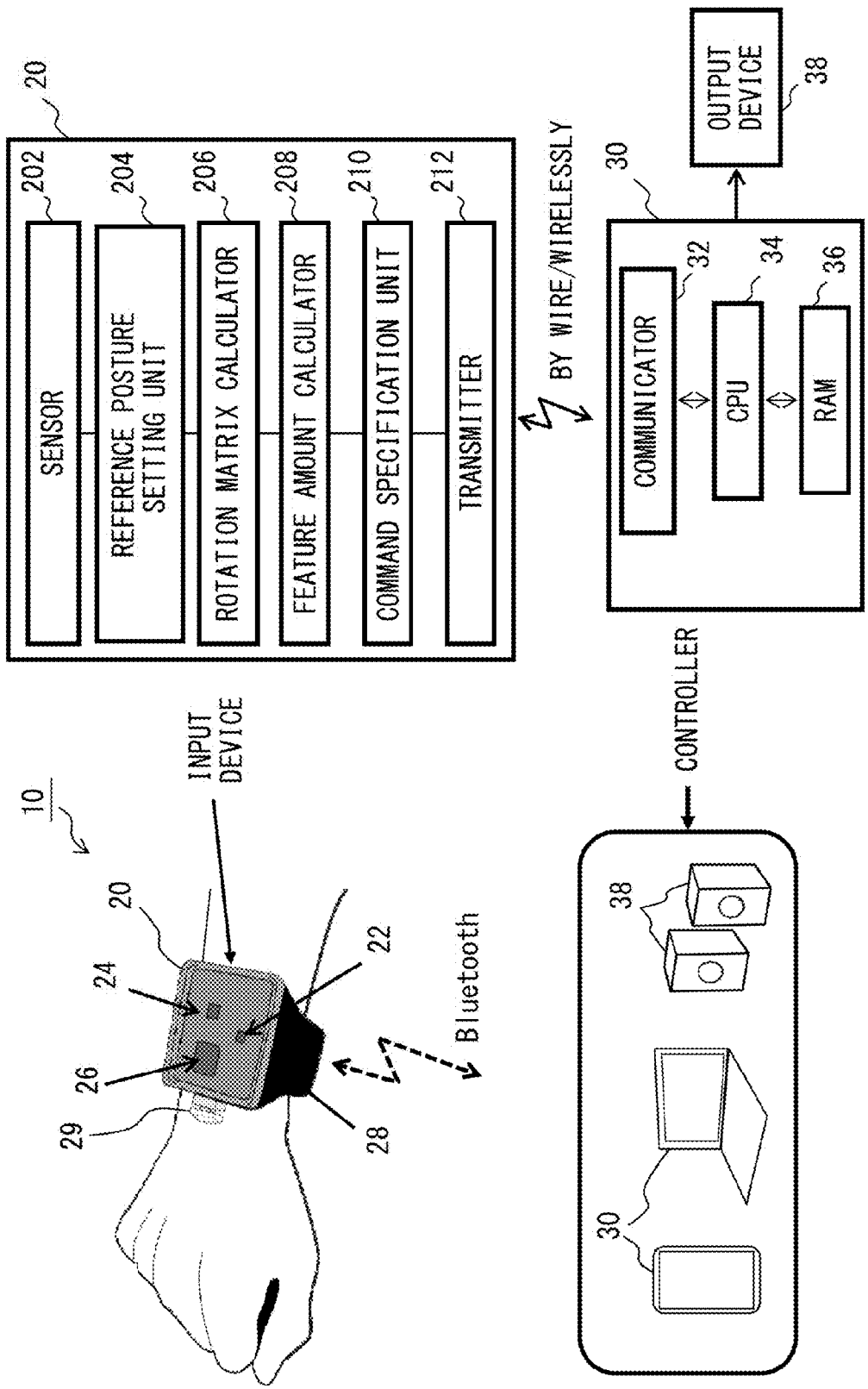
FIG. 1 illustrates an exemplary configuration of an input device.

FIG. 1 illustrates an example of an information processing device 10. The information processing device 10 includes an input device 20 and a controller 30. Examples of the information processing device 10 are a general-purpose personal computer, a game machine, equipment for business support or entertainment, a diagnostic device for a person's health condition or physical condition, or the like.

In the example of FIG. 1, the input device 20 is worn around the right wrist of a user.

As illustrated in FIG. 1, the input device 20 includes a sensor 202, a reference posture setting unit 204, a rotation matrix calculator 206, a feature amount calculator 208, a command specification unit 210, and a transmitter 212.

Figure 2:
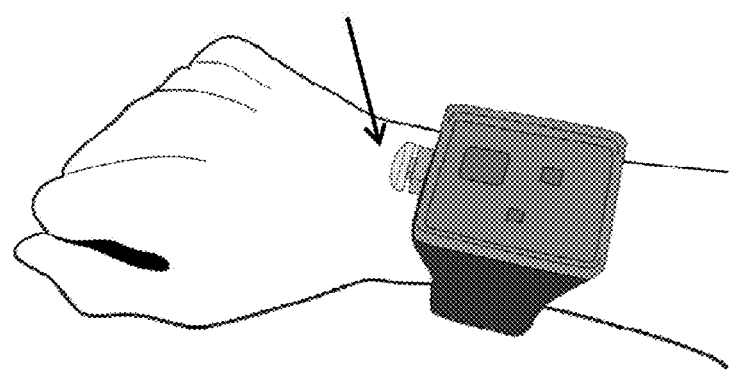
FIG. 2 illustrates an example of a dorsiflexion detection switch that sets a reference posture.

Further, the input device 20 includes a sensor 22, a micro processing unit (MPU) 24, a communicator 26, a fixture 28, and a reference posture setting switch 29. The reference posture setting switch 29 of the input device 20 is used for setting a reference posture. In addition, as illustrated in FIG. 2, the reference posture setting switch 29 may be a dorsiflexion detection switch 29. The dorsiflexion detection switch 29 can be pressed by bending a user's wrist toward the back of a user's hand. When the dorsiflexion detection switch 29 is pressed, a reference posture may be set. In addition, a user's posture at a time when a prescribed time period, such as two seconds or five seconds, has passed after pressing the dorsiflexion detection switch 29 may be set to be a reference posture.

Each of the reference posture setting unit 204, the rotation matrix calculator 206, the feature amount calculator 208, and the command specification unit 210 can be configured by the MPU 24 and a computer program for controlling the MPU 24.

In addition, the communicator 26 can configure the transmitter 212.

Figure 3:
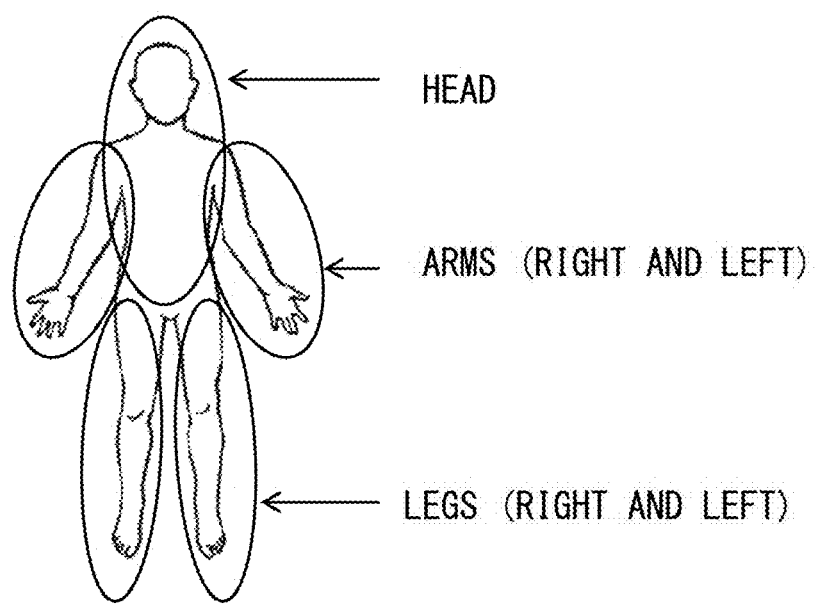
FIG. 3 illustrates an example of classification of body parts.

As illustrated in FIG. 3, body parts are classified into a "head", an "arm", and a "leg".

The head may include a portion above the neck, and a portion from the neck to the abdomen. The arm can be an arm portion below a shoulder. The leg can be a leg portion below a hip joint.

In the embodiment described below, the input device 20 provided with a triaxial angular velocity sensor and a triaxial acceleration sensor is held in a user's hand or is worn around a user's wrist, a feature amount is calculated that corresponds to a movement of an upper limb regardless of a wrist position or posture at a start time, and a command for controlling a device is selected on the basis of the feature amount. Of course, another auxiliary feature amount may be used simultaneously as needed.

The sensor 22 (sensor 202) obtains an angular velocity and an acceleration. The sensor 22 (sensor 202) may include an angular velocity sensor and an acceleration sensor. The description below is given using an example in which the sensor 22 includes both the angular velocity sensor and the acceleration sensor; however, the sensor 22 does not need to include both the angular velocity sensor and the acceleration sensor, if either of the sensors has the functions described below. In addition, an angular velocity sensor and/or an acceleration sensor may be provided separately from the input device 20, and the sensor 22 may obtain an angular velocity and an acceleration from the angular velocity sensor and/or the acceleration sensor. In this case, the angular velocity sensor and/or the acceleration sensor may be worn on a portion of a body, such as a wrist or an ankle, separately from the input device 20, and the input device 20 may be put into a chest pocket of a user's clothing, or may be attached to a belt or suspenders.

The sensor 22 (202) may obtain an angular velocity and an acceleration from sensors other than the angular velocity sensor and the acceleration sensor. As an example, the sensor 22 (202) may be configured using at least one of a gyro sensor, an electronic compass, a camera, a muscle potential sensor, and the like.

The micro processing unit (MPU) 24 generates an input command using an angular velocity and an acceleration detected by the sensor 22.

Figure 4:
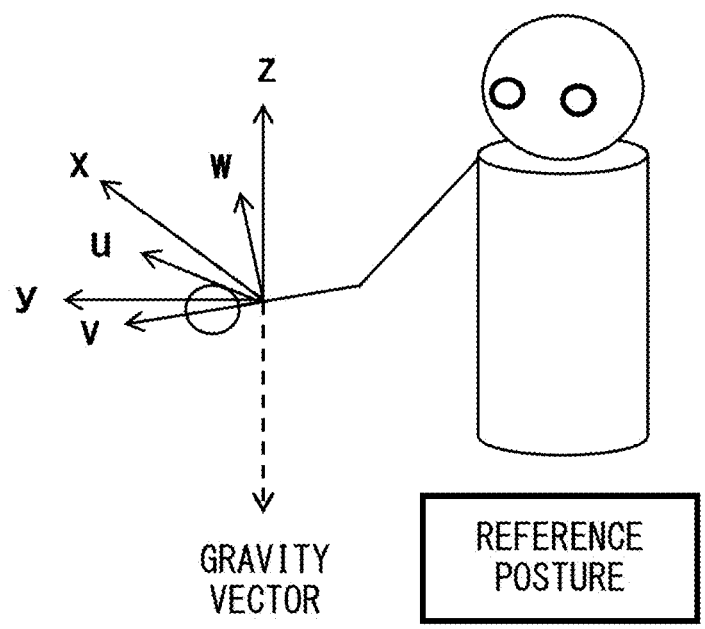
FIG. 4 illustrates an example of an orthogonal coordinate system that is set for the reference posture.

As illustrated in FIG. 4, the reference posture setting unit 204 first uses a posture at the time of starting a motion as a reference posture, and sets an orthogonal coordinate system x-y-z for the reference posture.

Examples of a timing at which a reference posture is set include a timing at which a user's body enters into a prescribed joint posture or physiological state, a timing at which a user finishes a prescribed body motion, a timing at which a user performs a prescribed operation on a device, or other timings.

Examples of a timing at which a user's body enters into a prescribed joint posture or physiological state include a timing at which a dorsiflexion angle exceeds a reference value, a timing at which lips are separated from each other, a timing at which a first is clenched, and a timing at which a heart rate exceeds a reference value. In order to determine whether a user's body enters into a prescribed joint posture or physiological state, the sensor 22 (202) may be provided with a sensor that measures a dorsiflexion angle or a sensor that measures a heart rate. In addition, the input device 20 may receive, from outside, data needed for determining whether a user's lips are separated from each other or whether a user clenches his or her fist. As an example, the input device 20 may receive an image of a user. Alternatively, the input device 20 may perform the determinations as described above using items of measurement data of an angular velocity sensor and an acceleration sensor.

Examples of a timing at which a user finishes a prescribed body motion include a timing at which a user draws two or more circles using a hand, a timing at which a first is clenched three times or more, a timing at which eyes are closed for three seconds or more, and other timings. The input device 20 may receive, from outside, data needed for determining whether a user performs the motions as described above. As an example, the input device 20 may receive an image of a user. Alternatively, the input device 20 may perform the determination as described above using items of measurement data of an angular velocity sensor and an acceleration sensor.

Examples of a timing at which a user performs a prescribed operation on a device include a timing at which a switch is pressed, a timing at which a dial is rotated up to a prescribed position, and a timing at which a voltage that exceeds a reference value is applied to the device. In particular, when the reference posture setting switch 29 of the input device 20 is pressed, a reference posture may be set. In addition, the reference posture setting switch 29 of the input device 20 may be a switch for inputting a timing of performing reference setting.

When a coordinate system fixed in a device that is held in a hand or is worn around a wrist is assumed to be a coordinate system u-v-w, a z axis is an axis that passes through the same coordinate origin as those of u, v, and w axes, and that is parallel to a gravity vector and has a direction that is the reverse of that of the gravity vector. An x axis is an axis that passes through the same coordinate origin as those of the u, v, and w axes, and that is orthogonal to the z axis and a v axis. A y axis is an axis that passes through the same coordinate origin as those of the u, v, and w axes, and that is orthogonal to the z axis and the x axis. In this case, the x and y axes are on a horizontal plane regardless of inclination of the u and w axes with respect to the gravity vector (a twist of an arm).

The rotation matrix calculator 206 respectively calculates Euler angles $\theta$, $\psi$, and $\phi$ around the x, y, and z axes of the u-v-w coordinate system with respect to an x-y-z coordinate system on the basis of a value of the acceleration sensor of the sensor 22.

Figure 5:
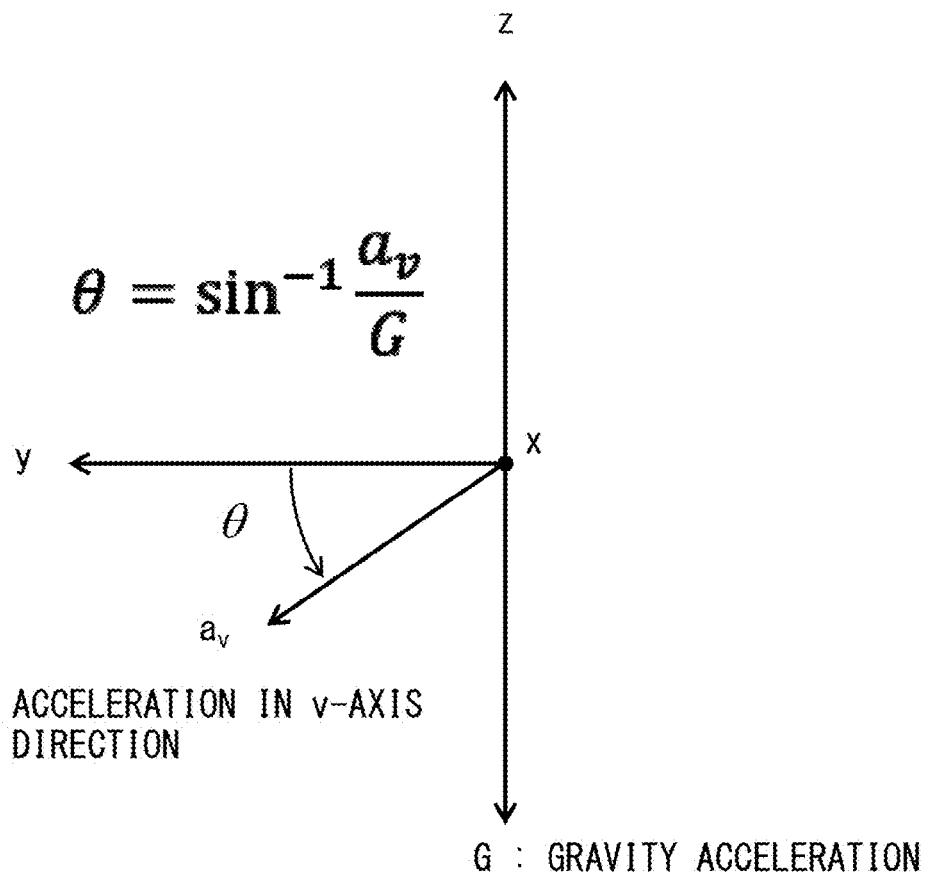
FIG. 5 is a diagram explaining an Euler angle $\theta$.

FIG. 5 is a diagram explaining the Euler angle $\theta$.

An observation value of the acceleration sensor includes a gravity acceleration and an inertia acceleration (an acceleration due to movement). Assuming that a device is stationary in a reference posture, the observation value matches the gravity acceleration. When the observation value does not match the gravity acceleration, only gravity acceleration components are calculated using a low-pass filter. Here, u, v, and w components of the gravity acceleration are assumed to be au, av, and aw, respectively.

An orientation of a gravity acceleration G is made to match a minus direction of the z axis. The Euler angle $\theta$ around the x axis of the u-v-w coordinate system with respect to the x-y-z coordinate system is defined by the following expression:

$$\theta = \sin^{-1} \frac{a_v}{G}$$

Figure 6:
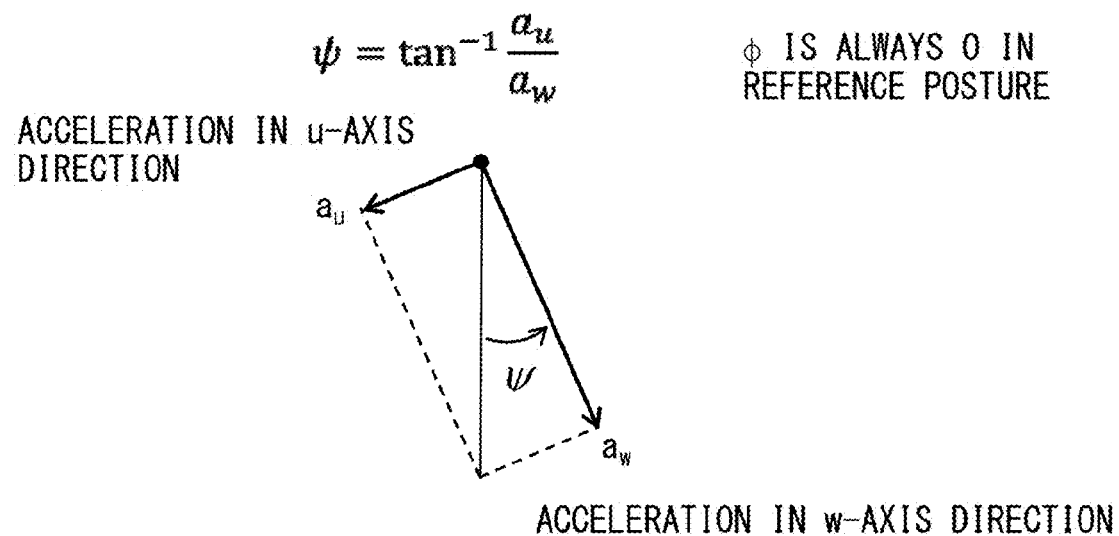
FIG. 6 is a diagram explaining an Euler angle $\psi$.

FIG. 6 is a diagram explaining the Euler angle $\psi$.

Here, u and w components of a gravity acceleration are assumed to be au and aw, respectively. The Euler angle $\psi$ around the y axis of the u-v-w coordinate system with respect to the x-y-z coordinate system is defined by the following expression:

$$\psi = \tan^{-1} \frac{a_u}{a_w}$$

The Euler angle $\phi$ around the z axis of the u-v-w coordinate system with respect to the x-y-z coordinate system is always 0 in the reference posture.

The rotation matrix calculator 206 may determine the Euler angles $\theta$, $\psi$, and $\phi$ by one calculation, or may obtain the Euler angles $\theta$, $\psi$, and $\phi$, for example, by averaging a plurality of calculations.

When the Euler angle $\theta$ is near ±90°, both au and aw are minute, and therefore it is impossible to accurately calculate the Euler angle $\phi$ in some cases.

Figure 7A:
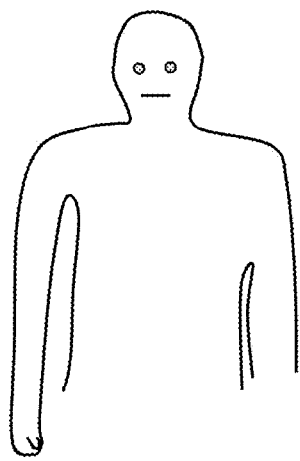
FIG. 7A illustrates an example of a posture in which a person puts his or her hands down.
Figure 7B:
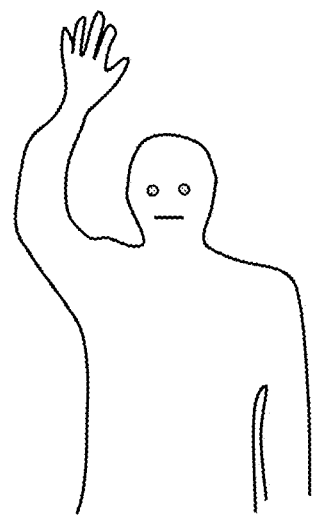
FIG. 7B illustrates an example of a posture in which a person raises a hand.

However, as illustrated in FIGS. 7A and 7B, palms are likely to be in contact with one's body when one's hands are naturally put down, and palms are directed outward when one's hands are raised, because of the characteristics of a human body. FIG. 7A illustrates an example of a posture in which a person puts his or her hands down. FIG. 7B illustrates an example of a posture in which a person raises a hand. As illustrated in FIG. 7A, generally, palms are likely to be directed toward a direction facing the thighs when a person naturally puts his or her hands down. In addition, as illustrated in FIG. 7B, generally, a palm is likely to be directed toward a forward direction of a body when a person raises his or her hand. Therefore, when $\theta$ exceeds a threshold value, $\psi$ is set as illustrated in FIG. 8. In other words, when $\theta = \pm 90°$ is established, $\psi = +90°$ is established.

In addition, the rotation matrix calculator 206 calculates a rotation matrix R that converts an angular velocity in the u-v-w coordinate system into an angular velocity in the x-y-z coordinate system on the basis of the Euler angles $\theta$, $\psi$, and $\phi$. At this time, a posture of a wrist is changed in accordance with a motion of an upper limb, and therefore the rotation matrix R is updated using periodically obtained values of the angular velocity sensor.

The rotation matrix R is defined by the following expression using the Euler angles $\theta$, $\psi$, and $\phi$:

$$R = \begin{bmatrix} 1 & 0 & 0 \\ 0 & \cos\theta & -\sin\theta \\ 0 & \sin\theta & \cos\theta \end{bmatrix} \begin{bmatrix} \cos\psi & 0 & \sin\psi \\ 0 & 1 & 0 \\ -\sin\psi & 0 & \cos\psi \end{bmatrix} \begin{bmatrix} \cos\phi & -\sin\phi & 0 \\ \sin\phi & \cos\phi & 0 \\ 0 & 0 & 1 \end{bmatrix}$$

FIG. 9 is a diagram explaining rotation matrix elements $\omega x$, $\omega y$, and $\omega z$. Angular velocities around the x, y, and z axes are assumed to be $\omega x$, $\omega y$, and $\omega z$, respectively, and angular velocities around u, v, and w axes are assumed to be $\omega m$, $\omega y$, and $\omega w$, respectively. The conversion of $\omega m$, $\omega v$, and $\omega w$ into $\omega x$, $\omega y$, and $\omega z$ is expressed by the following:

$$\begin{bmatrix} \omega_x \\ \omega_y \\ \omega_z \end{bmatrix} = R \begin{bmatrix} \omega_u \\ \omega_v \\ \omega_w \end{bmatrix}$$

The rotation matrix calculator 206 approximately updates the rotation matrix R. A method for obtaining a posture on the basis of a gravity acceleration is likely to be affected by noise or an inertia acceleration during motion. In view of this, the rotation matrix R is updated on the basis of angular velocities of respective axes.

In a method for updating Euler angles and re-calculating a rotation matrix R, for example, the following is performed.

Angular velocities at the time of time t=n×dt are assumed to be ωx(n), ωy(n), and ωz(n), respectively. Euler angles at the time of time t=n×dt are assumed to be θ(n), ψ(n), and φ(n), respectively. Similarly, Euler angles at the time of time t=(n−1)×dt are assumed to be θ(n−1), ψ(n−1), and φ(n−1), respectively. Here, dt is a sampling cycle, i.e., a time difference between a time of obtaining previous angular velocities and a time of obtaining current angular velocities. The Euler angles θ(n), ψ(n), and φ(n) at the time of time t=n×dt are obtained by the following expression:

$$\begin{bmatrix} \theta(n) \\ \psi(n) \\ \phi(n) \end{bmatrix} = \begin{bmatrix} \theta(n-1) \\ \psi(n-1) \\ \phi(n-1) \end{bmatrix} + \begin{bmatrix} \omega_x(n) \\ \omega_y(n) \\ \omega_z(n) \end{bmatrix} dt$$

A rotation angle ηx around the x axis and a rotation angle ηz around the z axis are respectively defined by the following expressions:

$$\eta_x = \int dt \cdot \omega_x$$

$$\eta_z = \int dt \cdot \omega_z$$

Figure 10:
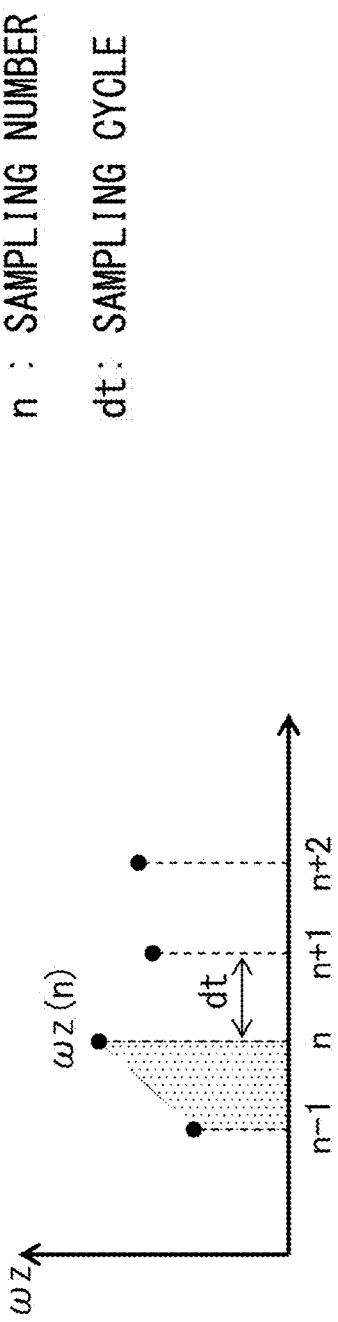
FIG. 10 is a diagram explaining the integral of a rotation angle $\eta z$.

The formulae are defined in a discrete system by the following:

$$\eta_x = \eta_x(0) + \sum \frac{(\omega_x(n) + \omega_x(n-1)) \cdot dt}{2}$$

$$\eta_z = \eta_z(0) + \sum \frac{(\omega_z(n) + \omega_z(n-1)) \cdot dt}{2}$$

where ηx(0) and ηz(0) are initial values. FIG. 10 is a diagram explaining the integral of the rotation angle ηz. The second term on the right side of the above expression expresses a shaded portion of FIG. 10.

Figure 11:
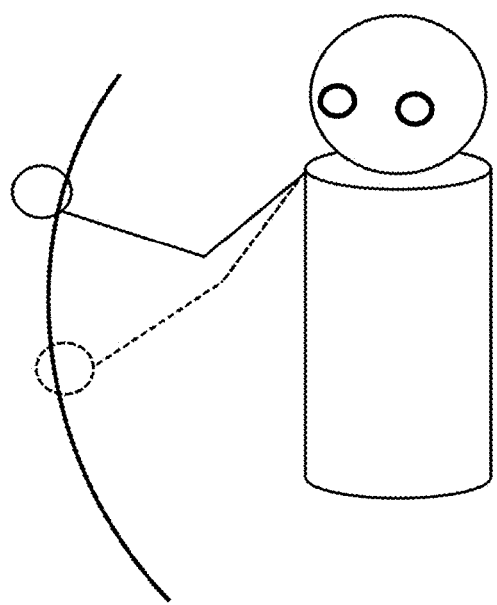
FIG. 11 is a diagram explaining a rotation angle $\eta x$.
Figure 12:
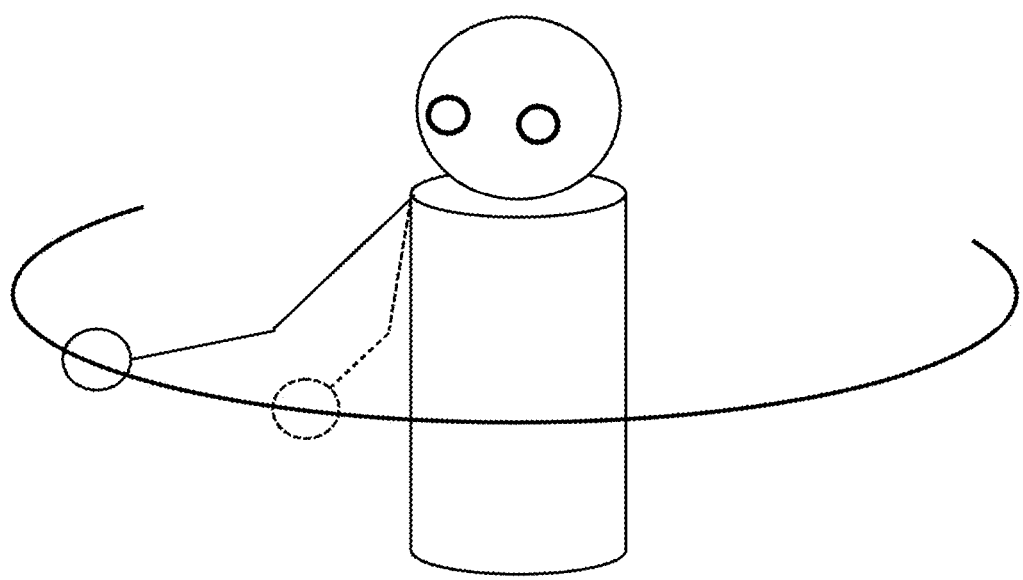
FIG. 12 is a diagram explaining a rotation angle $\eta z$.

FIG. 11 is a diagram explaining the rotation angle ηx. FIG. 12 is a diagram explaining the rotation angle ηz.

As illustrated in FIG. 11, the rotation angle ηx is generated by a motion of rotating a user's arm around the x axis extending in a direction vertical to a body axis. As illustrated in FIG. 12, the rotation angle ηz is generated by a motion of moving a user's arm within a horizontal plane.

Figure 13:
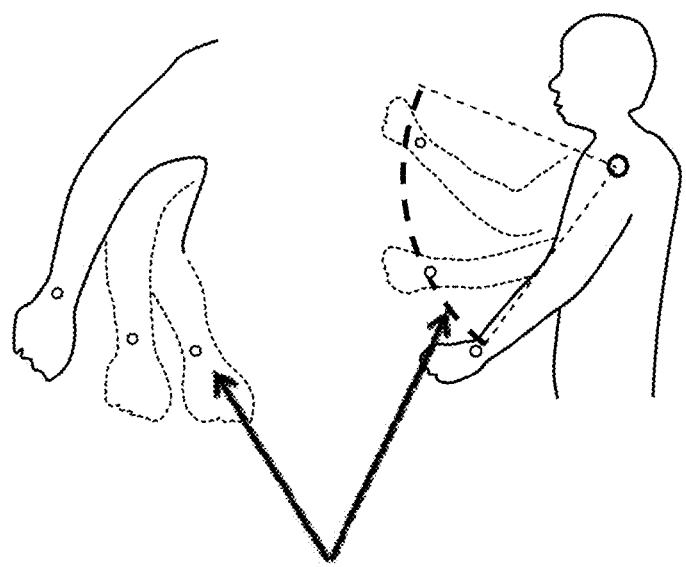
FIG. 13 illustrates an example of a rotation with a joint as the center.

FIG. 13 illustrates an example of a rotation with a joint as the center. FIG. 14 illustrates a motion of FIG. 13 in an orthogonal coordinate system in a reference posture.

In order to measure a motion of an upper limb of a person, the input device 20 is worn around a user's wrist, and the wrist is moved in natural vertical and horizontal directions. It is assumed to be clear that, as a result, a rotation around the x axis corresponds to a vertical motion, as illustrated in FIG. 11, and that a rotation around the z axis corresponds to a horizontal motion. When an x-y-z coordinate system is defined for the reference posture, the rotations around the x axis and the z axis can be made to sensitively match vertical and horizontal motions of a person, no matter where a motion is started.

Figure 16:
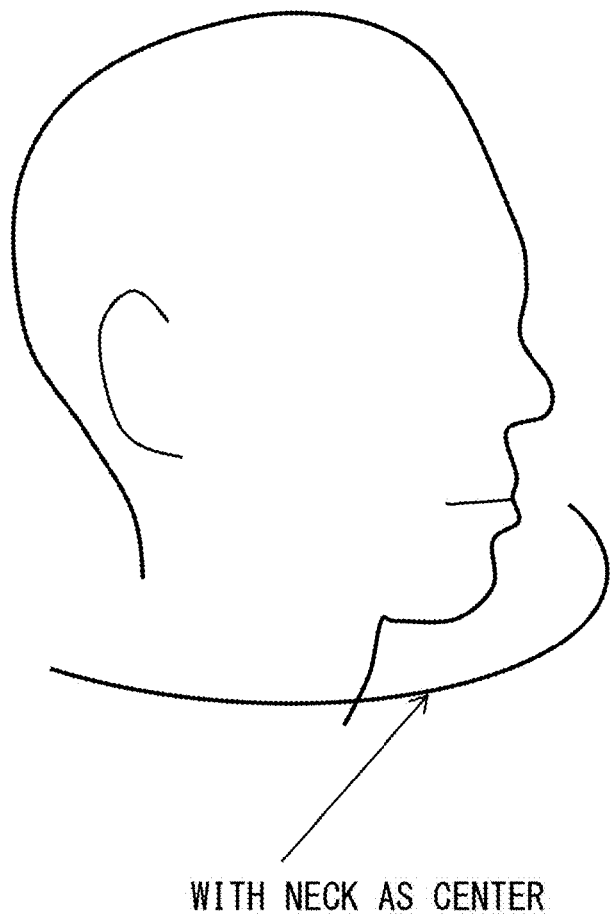
FIG. 16 illustrates an example of a coordinate system that is set in a neck.

In the above example, the input device 20 is worn on an arm, but a body part on which the input device 20 is worn is not limited to an arm. As an example, the input device 20 may be worn on an ankle, as illustrated in FIG. 15, or may be worn on the head, as illustrated in FIG. 16.

In addition, the feature amount calculator 208 integrates angular velocities that have been converted into angular velocities in an x-y-z coordinate system, calculates rotation angles ηx and ηz around the x axis and the z axis, and sets the rotation angles to be feature amounts.

In the above example, a user's motion is measured by the measurement device 20 worn around a wrist of the user, and rotation angles ηx and ηz around the x axis and the z axis are calculated as feature amounts. However, an amount referred to as an auxiliary feature amount may be detected in addition to the rotation angles ηx and ηz, and may be used for the specification of a command.

Examples of an auxiliary feature amount can include the following:

A movement amount of a wrist in a direction of a vector v, or a temporal change (velocity or acceleration) thereof An angle at which a wrist is twisted, or a temporal change thereof Clenching or unclenching of a fist An angle of a wrist or a temporal change thereof An ON/OFF operation of a switch An analog operation amount of a dial, a bending sensor, or the like, or a temporal change thereof FIG. 17 illustrates a vector passing through a wrist and an elbow as an example of an auxiliary feature amount.

The command specification unit 210 specifies a command for operating equipment on the basis of feature amounts calculated by the feature amount calculator 208. As an example, when the information processing device 10 is a karaoke machine, the command specification unit 210 may assign a command to an operation of turning up and down the sound volume of equipment or an operation of selecting music, using an index α as expressed by the expression below, relating to a ratio of the rotation angles ηx and ηz:

$$\alpha = \tan^{-1}\left(\frac{\eta_x}{\eta_z}\right)$$

In addition, the rotation angles ηx and ηz may be associated with mouse cursor positions using variable conversion such that a cursor of a personal computer can be operated using an upper limb motion.

Further, handwritten characters may be recognized using loci of the rotation angles ηx and ηz. Further, as an example, image magnification/reduction and image rotation may be performed in accordance with the rotation angles ηx and ηz, respectively.

Figure 18:
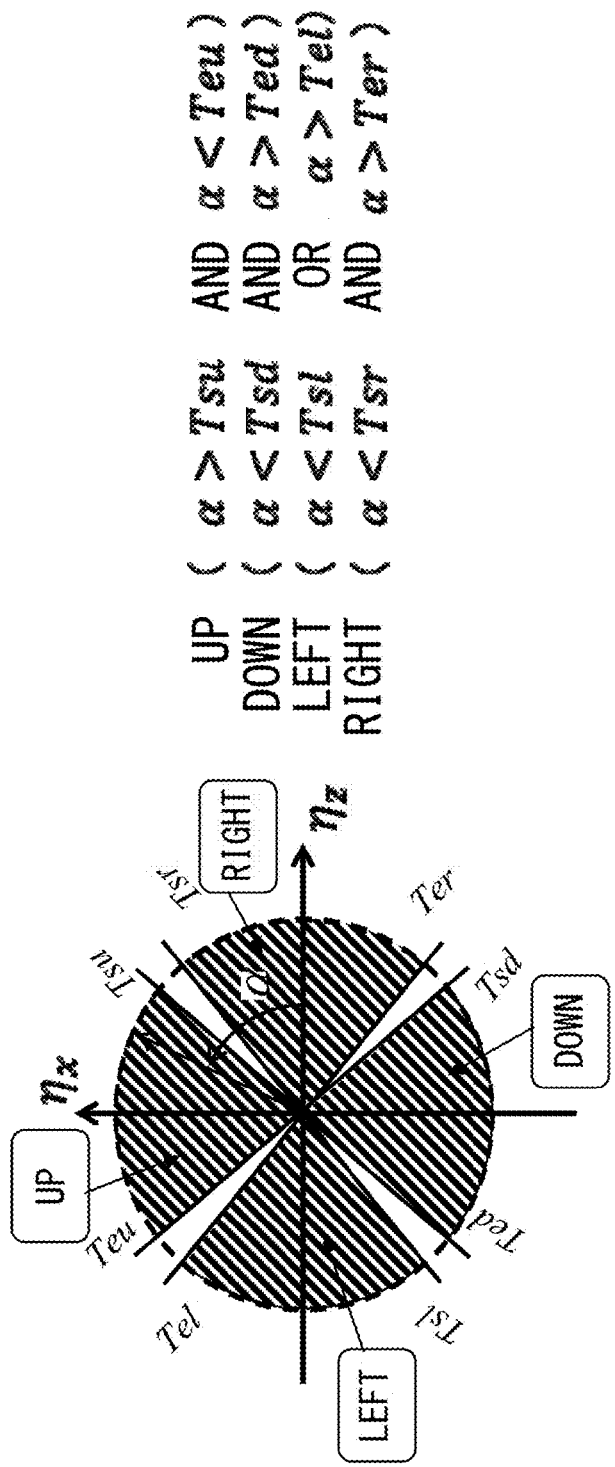
FIG. 18 illustrates an example of a relationship between a motion and a command.

FIG. 18 illustrates an example of a relationship between a motion and a command.

In the example illustrated in FIG. 18, one of the commands "left", "right", "up", and "down" is specified in accordance with a magnitude of the index α relating to a ratio of the rotation angles ηx and ηz.

As an example, when the index α is more than Tsu and is less than Teu, the command specification unit 210 may associate an upper limb motion with an "up" command. When the index α is less than Tsd and is more than Ted, the command specification unit 210 may associate the upper limb motion with a "down" command. When the index α is less than Tsl and is more than Tel, the command specification unit 210 may associate the upper limb motion with a "left" command. When the index α is less than Tsr and is more than Ter, the command specification unit 210 may associate the upper limb motion with a "right" command.

Figure 19A:
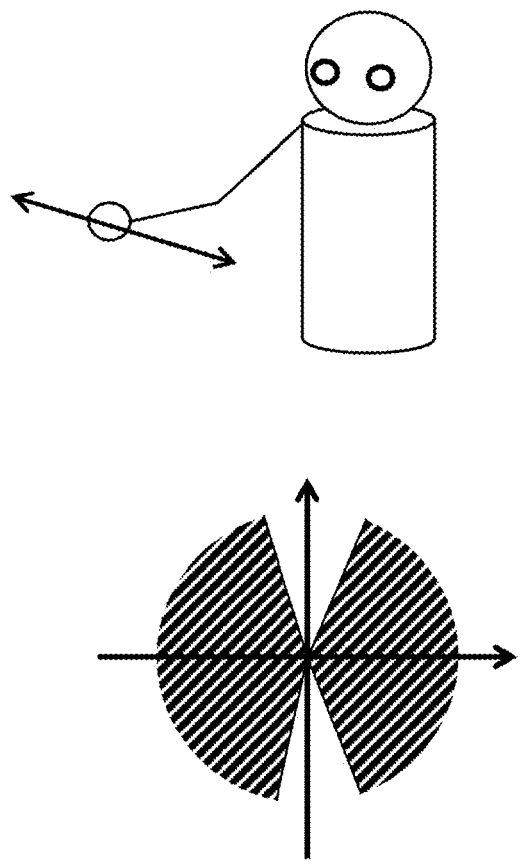
FIG. 19A illustrates an example of a relationship between a motion and a command in a case of two alternatives.
Figure 19B:
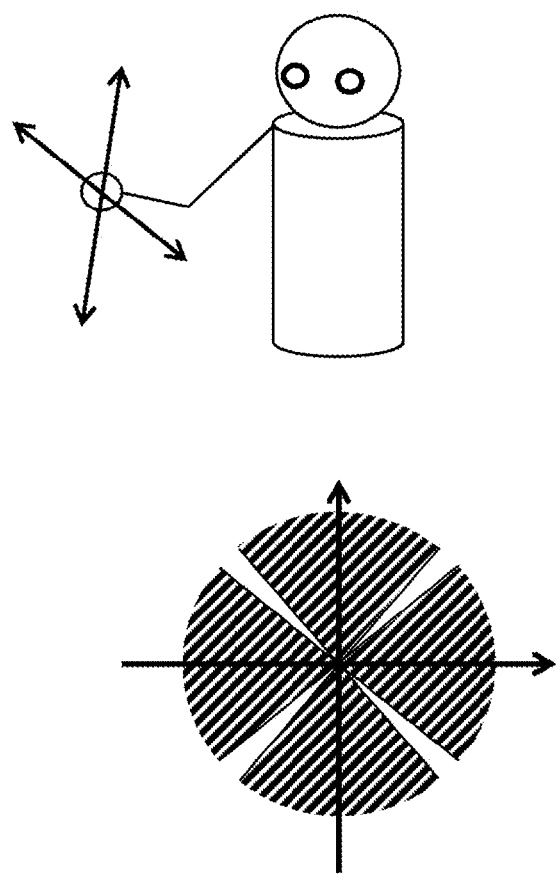
FIG. 19B illustrates an example of a relationship between a motion and a command in a case of four alternatives.
Figure 19C:
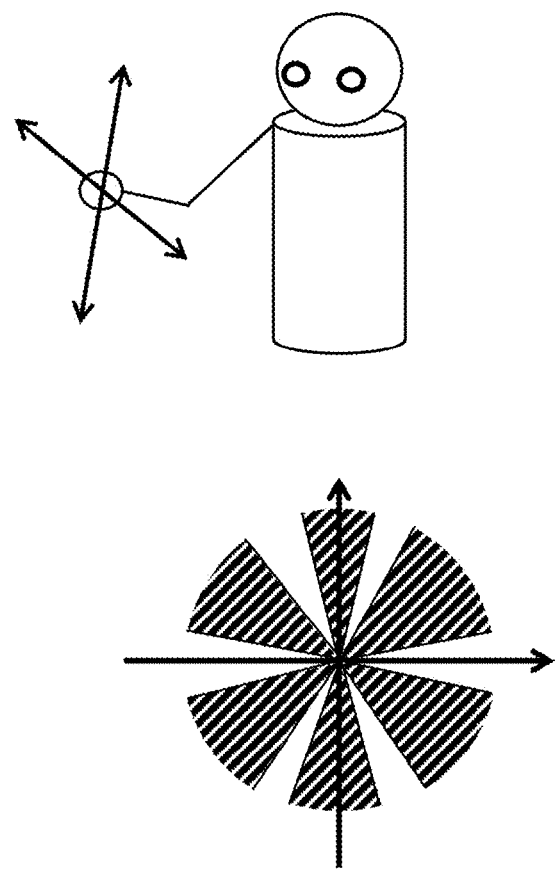
FIG. 19C illustrates an example of a relationship between a motion and a command in a case of six alternatives.

FIG. 19A illustrates an example of a relationship between a motion and a command in a case of two alternatives. FIG. 19B illustrates an example of a relationship between a motion and a command in a case of four alternatives. FIG. 19C illustrates an example of a relationship between a motion and a command in a case of six alternatives.

In a case of two alternatives as illustrated in FIG. 19A, one of the two alternatives may be determined by whether a wrist around which the input device 20 is worn is moved leftward or rightward. In the lower diagram of FIG. 19A, a vertical axis and a horizontal axis may indicate rotation angles ηx and ηz, respectively.

In FIG. 19A, an ηx-ηz plane except the vicinity of a rotation angle ηz of 0[deg] is divided into two regions. Commands for controlling the controller 30 are assigned to the respective divided regions.

In cases of four and six alternatives as illustrated in FIG. 19B and FIG. 19C, one of the alternatives may be determined in accordance with a value of the index α. In the lower diagrams of FIG. 19B and FIG. 19C, vertical axes and horizontal axes may indicate rotation angles ηx and ηz, respectively.

In FIG. 19B, the ηx-ηz plane is divided into four regions. In FIG. 19C, the ηx-ηz plane is divided into six regions. Commands for controlling the controller 30 are given to the respective divided regions.

In addition, the number of alternatives may be dynamically changed on the basis of a controlled object, a reference posture, a current posture, the distribution of angular velocities, or the like.

Figure 20:
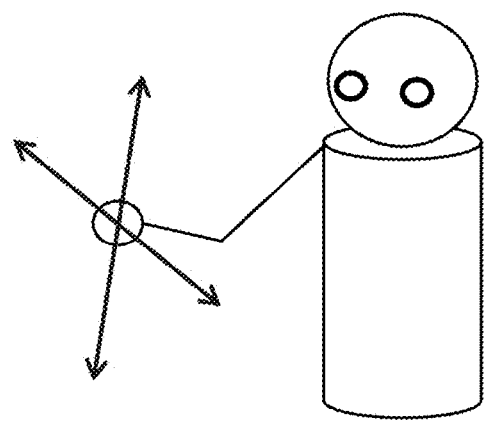
FIG. 20 is a diagram explaining optimization of a relationship between a motion and a command for a user.
Figure 21:
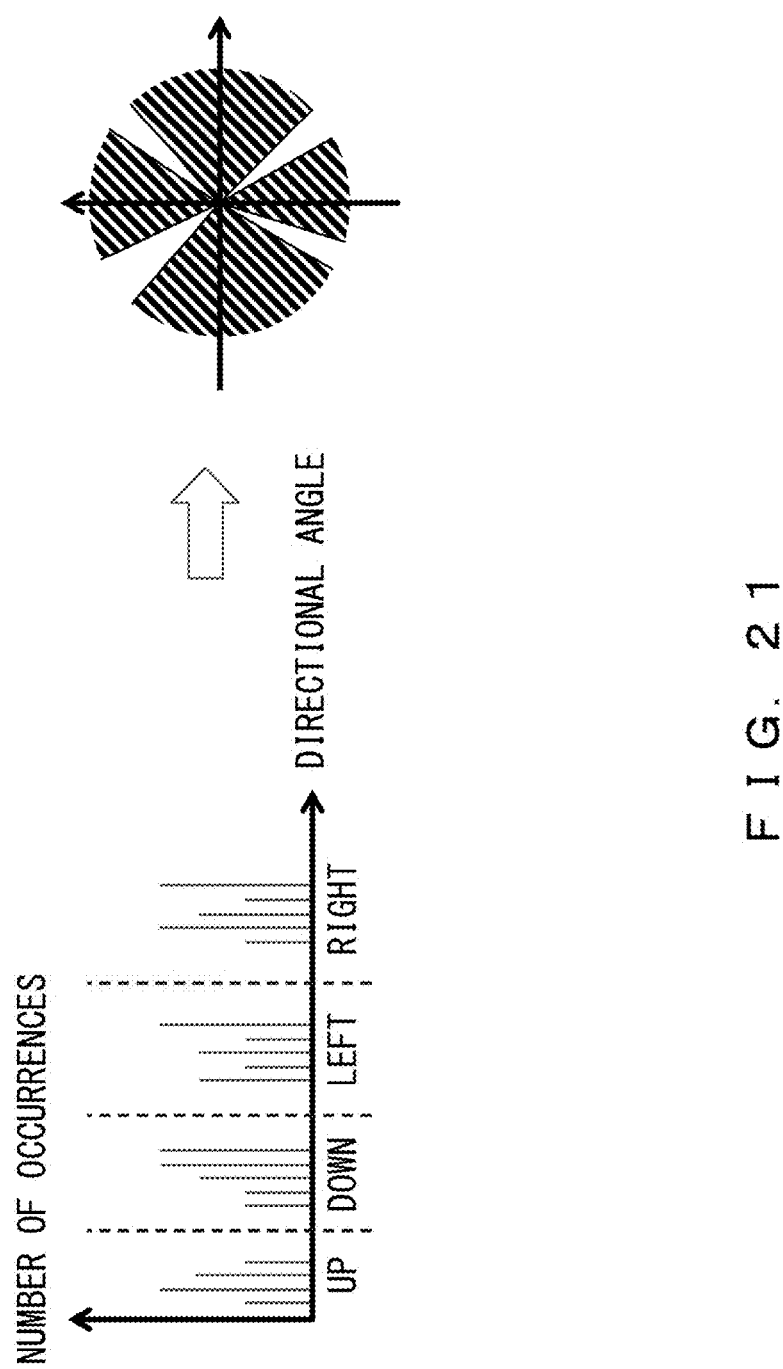
FIG. 21 is a diagram explaining optimization of a relationship between a motion and a command for a user.

FIG. 20 and FIG. 21 are diagrams explaining optimization of a relationship between a motion and a command for a user.

As illustrated in FIG. 20, a correspondence between a direction and a movement of a user can be learnt by making a user move his or her wrist in an instructed direction from among leftward, rightward, upward, and downward directions. Then, as illustrated in FIG. 21, directional angles in movements in the respective directions may be calculated so as to determine optimum threshold values on the basis of calculation results. As a result, threshold values can be set that are suitable for a tendency of the movement of a specific user.

In FIGS. 19A-19C, for example, the divided regions have almost the same size as each other. However, the command specification unit 210 may divide the ηx-ηz plane non-uniformly.

FIG. 21 is a diagram explaining a method for dividing the ηx-ηz plane non-uniformly.

A frequency of each posture of a user may be counted as the number of occurrences at each directional angle, and the ηx-ηz plane may be divided non-uniformly in accordance with the distribution of the numbers of occurrences.

The transmitter 212 transmits, to the controller 30, a command generated by the command specification unit 210.

As described above, the input device 20 is provided that is worn on a portion of a user's body, such as a hand, an ankle, or the neck, and that inputs commands into the controller 30.

The sensor 202 obtains angular velocities and an acceleration in the u-v-w coordinate system, which is a first coordinate system fixed in the input device 20.

The reference posture setting unit 204 sets the x-y-z coordinate system, which is a second coordinate system, for a reference posture, which is a standard of a user's posture.

The rotation matrix calculator 206 calculates a rotation matrix that converts angular velocities in the first coordinate system, i.e., the u-v-w coordinate system, into angular velocities in the second coordinate system, i.e., the x-y-z coordinate system, using an acceleration in the first coordinate system, the u-v-w coordinate system. One axis of the second coordinate system, i.e., the x-y-z coordinate system, may match a gravity direction. In addition, the rotation matrix may be calculated using Euler angles around respective axes of the first coordinate system, i.e., the u-v-w coordinate system, with respect to the second coordinate system, i.e., the x-y-z coordinate system.

The feature amount calculator 208 calculates feature amounts in the second coordinate system, the x-y-z coordinate system, using angular velocities in the second coordinate system, the x-y-z coordinate system. The feature amounts may be calculated on the basis of a first rotation angle and a second rotation angle that correspond to rotation angles around two axes of the second coordinate system, the x-y-z coordinate system. In addition, feature amounts relating to rotation angles around axes of the second coordinate system, the x-y-z coordinate system, may be calculated using angular velocities in the second coordinate system, the x-y-z coordinate system.

The command specification unit 210 specifies a command using the feature amounts. The command specification unit 210 may select one of an arbitrary number of candidates for the command on the basis of the feature amounts. In addition, the command specification unit 210 may dynamically change the number of candidates for the command.

The transmitter 212 transmits the command, and inputs the command into a device.

The input device 20 further includes the switch 29 that specifies a timing at which a reference posture is set.

In addition, the reference posture setting unit 204 may set the reference posture when a user starts a motion.

The input device 20 and the controller 30 are electrically connected by wire or wirelessly. In the example illustrated in FIG. 1, the input device 20 communicates information with the controller 30 using Bluetooth®.

As illustrated in FIG. 1, the controller 30 may be a smartphone or a personal computer. The controller 30 may be connected to an output device 38. The output device 38 is, for example, a loudspeaker.

The controller 30 may include a communicator 32, a central processing unit (CPU) 34, and a memory (RAM) 36.

The communicator 32 receives commands from the input device 20.

The central processing unit (CPU) 34 performs a prescribed process in response to the command that the communicator 32 receives. The RAM 36 may store a computer program that specifies operation of the CPU 34.

Results of processes performed by the CPU 34 are output from the output device 38 to a user. The output device 38 is, for example, a display, a loudspeaker, or the like. The output device 38, such as a display or a loudspeaker, may be combined with a device worn on a body, such as the input device 20, so as to be integrated. Alternatively, the output device 38, such as a display or a loudspeaker, may be worn on a body separately from the input device 20.

Figure 22:
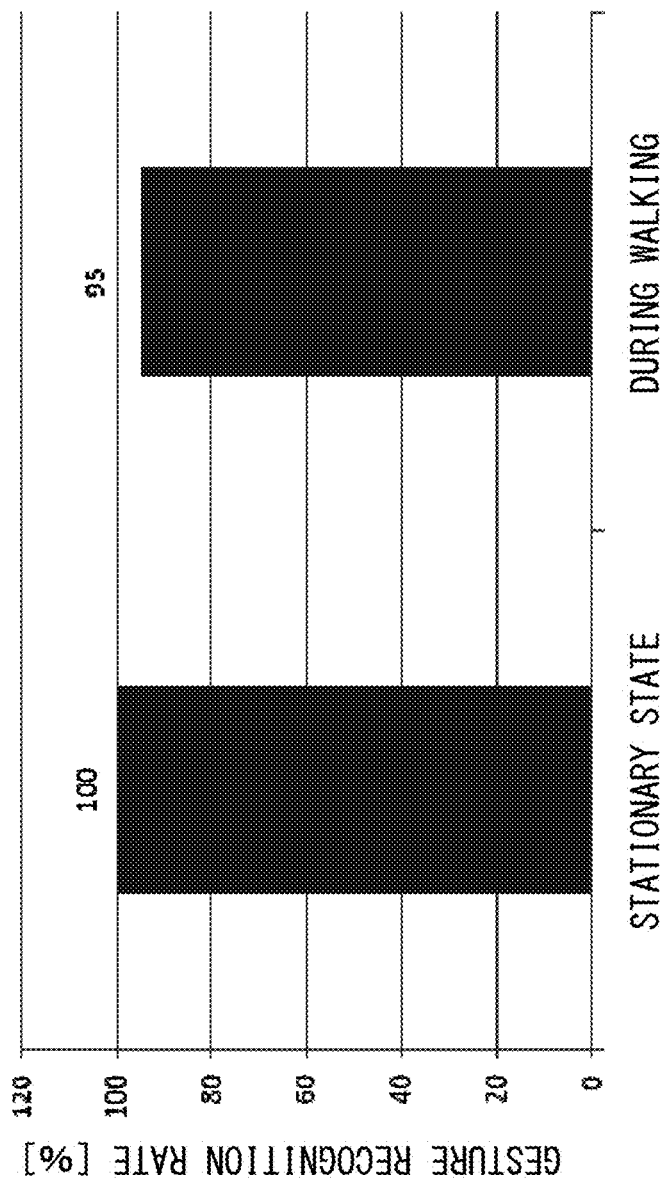
FIG. 22 illustrates a gesture recognition rate during walking.

FIG. 22 illustrates an example of a gesture recognition rate during walking.

In the example illustrated in FIG. 22, four types of gestures, i.e., up, down, left, and right, are respectively performed five times; in other words, twenty experiments in total are performed. As illustrated in FIG. 22, a recognition rate in a stationary state is 100%. In addition, a recognition rate during walking is 95%, which is very high.

As described above, the input device 20 converts sensor information that is obtained from an input device that is worn on a body, a hand, or a leg, into a coordinate system that is suited to human senses, and selects a command for controlling a device, and therefore a user can operate a device in a free body position or posture.

By using the input device 20 that has the configuration above, a user can start a body motion in a free body position and posture, and therefore convenience is enhanced for a user. In addition, the input device 20 enables matching a natural movement of a person and an operation regardless of a start position or posture of a body motion, and therefore the learning burden on a user can be reduced. Further, the input device 20 enables providing two continuous feature amounts, and therefore the input device 20 can be applied to analog operations, such as sound volume adjustment or the movement of a pointer. In addition, the input device 20 does not use an acceleration sensor for purposes other than the determination of Euler angles in a reference posture, and therefore an influence of noise or inertia components by a motion can be reduced. Further, in the input device 20, only an angular velocity sensor obtains rotation angles after the reference posture is determined, and therefore there is an advantage that the input device 20 is not influenced by rotation angles when an extreme rotation is not performed even during a translational movement of an entire body, such as normal walking.

Figure 23:
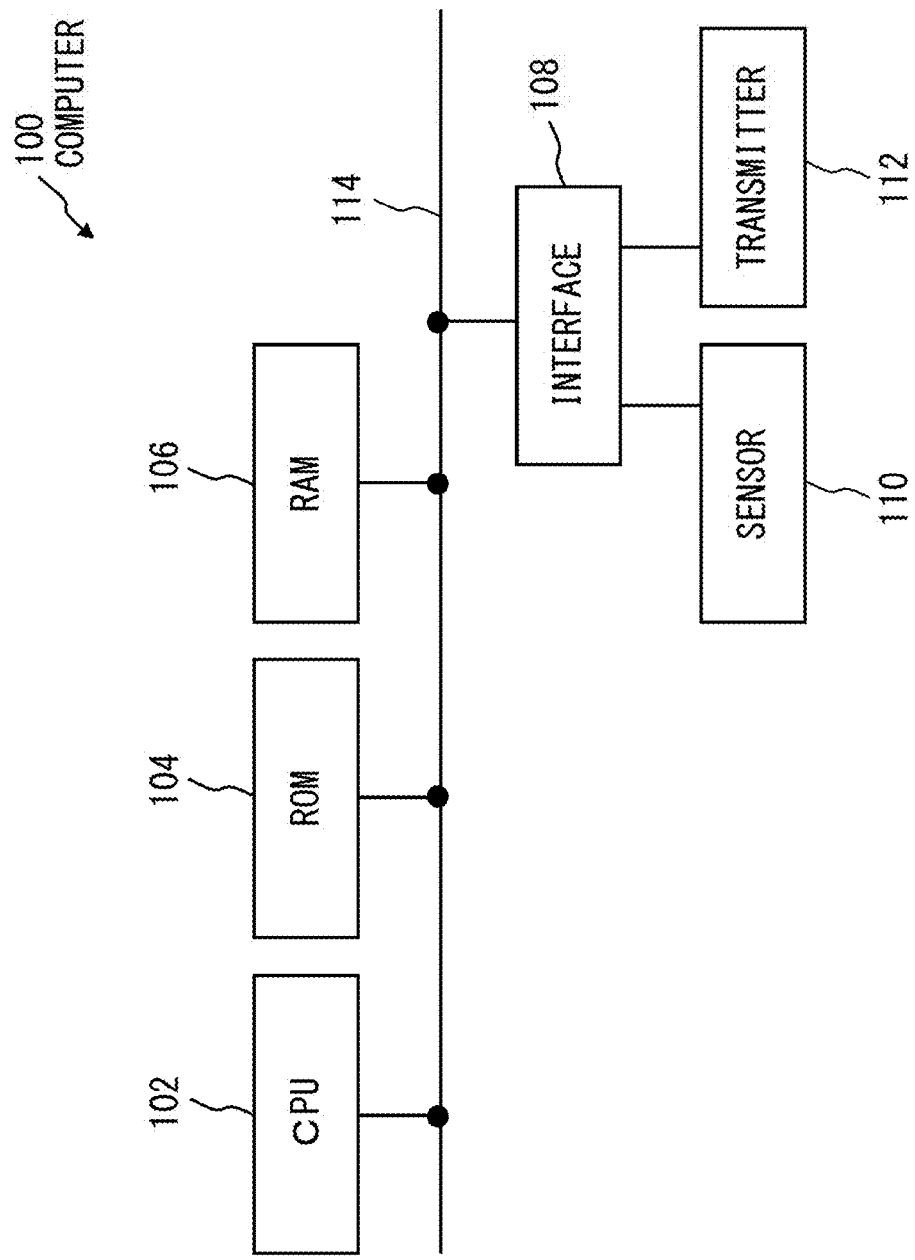
FIG. 23 illustrates an exemplary configuration of an input device.

FIG. 23 illustrates an exemplary configuration of the input device 20 according to the embodiment.

A computer 100 includes a Central Processing Unit (CPU) 102, a Read Only Memory (ROM) 104, a Random Access Memory (RAM) 106, and an interface 108. These components are connected to each other via a bus line 114, and can transmit/receive various items of data to/from each other under the control of the CPU 102. The interface 108 is connected to a sensor 110 and a transmitter 112.

The Central Processing Unit (CPU) 102 is a processing unit that controls operations of the entirety of the computer 100, and functions as a control processing unit of the computer 100. The CPU 102 may be a processor.

The Read Only Memory (ROM) 104 is a read-only semiconductor memory in which a prescribed basic control program has been stored. The CPU 102 can control operations of respective components of the computer 100 by reading and executing the basic control program at the time of starting the computer 100.

The Random Access Memory (RAM) 106 is a semiconductor memory that is writable and readable at any time and that the CPU 102 uses as a working storage area as needed when the CPU 102 executes various control programs.

The interface 108 manages the transmission/reception of various types of information to/from various pieces of equipment that are connected to the computer 100.

The sensor 110 may be, for example, an angular velocity sensor or an acceleration sensor.

The transmitter 112 transmits calculation results of the CPU 102 as electric signals to the outside.

In addition, the switch 29 of FIG. 1 may be connected to the interface 108, although this is not illustrated.

In order to configure the input device 20 using the computer 100 as described above, a control program, for example, is generated for causing the CPU 102 to perform processes performed by respective processing units as described above. The generated control program has been stored in the ROM 104 or the RAM 106. Then, a prescribed instruction is given to the CPU 102 so as to read and execute the control program. As a result, functions that an information processing unit has are provided by the CPU 102.

The input device 20 illustrated in FIG. 1 includes the sensor 202, the reference posture setting unit 204, the rotation matrix calculator 206, the feature amount calculator 208, the command specification unit 210, and the transmitter 212. However, some or all of the reference posture setting unit 204, the rotation matrix calculator 206, the feature amount calculator 208, and the command specification unit 210 may be provided in the controller 30.

In addition, the input device 20 and the controller 30 may be integrated. In this case, the transmitter 212 of the input device 20 and the communicator 32 of the controller 30 may be omitted.

Further, the input device 20, the controller 30, and the output device 38 may be integrated.

<Input Process>

Figure 24:
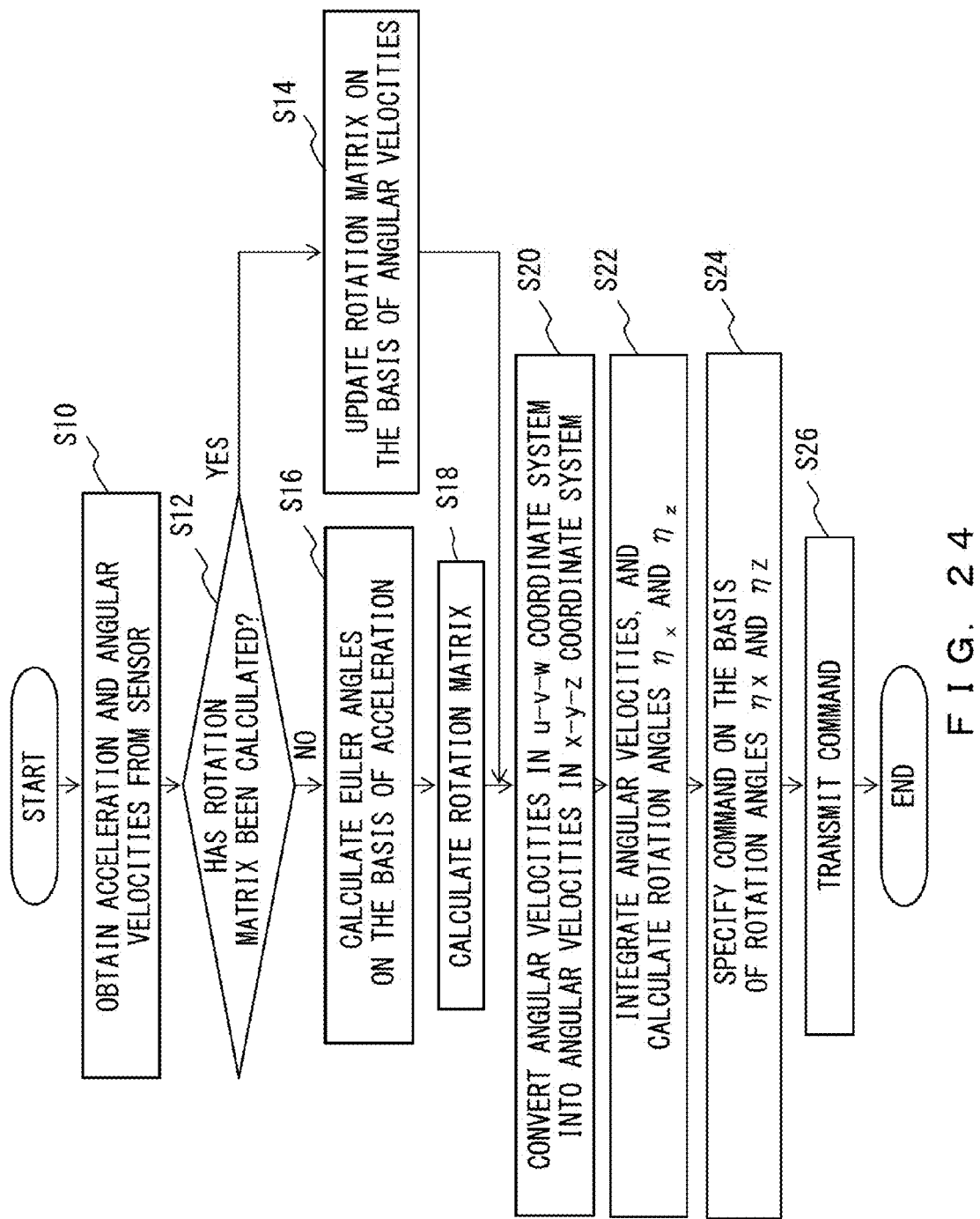
FIG. 24 illustrates an exemplary processing flow.

FIG. 24 illustrates an exemplary flow of an input process.

When the input device 20 is the general-purpose computer 200 as illustrated in FIG. 23, the description below defines a control program for performing processes performed by the general-purpose computer 200. In other words, the description below is a description of a control program for causing the general-purpose computer to perform the processes described below.

When a process is started, the sensor 202 of the input device 20 obtains an acceleration and angular velocities in S10.

At this time, the reference posture setting unit 204 of the input device 20 may set a posture at the time of starting a motion to be a reference posture, and may set an orthogonal coordinate system x-y-z with reference to the reference posture.

In S12, the rotation matrix calculator 206 of the input device 20 determines whether a rotation matrix R has been calculated. When the determination result is "Yes", that is, when the rotation matrix R has been calculated, the process moves on to S14. When the determination result is "No", that is, when the rotation matrix R has not been calculated, the process moves on to S16.

In S14, the rotation matrix calculator 206 of the input device 20 updates the rotation matrix on the basis of the angular velocities.

It is assumed, for example, that respective angular velocities at the time of time $t = n \times dt$ are $\omega x(n)$, $\omega y(n)$, and $\omega z(n)$. It is also assumed that respective Euler angles at the time of time $t = n \times dt$ are $\theta(n)$, $\psi(n)$, and $\phi(n)$. Similarly, it is assumed that respective Euler angles at the time of time $t = (n-1) \times dt$ are $\theta(n-1)$, $\psi(n-1)$, and $\phi(n-1)$. Here, dt is a sampling cycle, i.e., a time difference between a time of obtaining previous angular velocities and a time of obtaining current angular velocities. The Euler angles $\theta(n)$, $\psi(n)$, and $\phi(n)$ at the time of time $t = n \times dt$ are obtained by the following expression:

$$\begin{bmatrix} \theta(n) \\ \psi(n) \\ \phi(n) \end{bmatrix} = \begin{bmatrix} \theta(n-1) \\ \psi(n-1) \\ \phi(n-1) \end{bmatrix} + \begin{bmatrix} \omega_x(n) \\ \omega_y(n) \\ \omega_z(n) \end{bmatrix} dt$$

Using these updated Euler angles $\theta(n)$, $\psi(n)$, and $\phi(n)$, the rotation matrix R can be updated as the following:

$$R = \begin{bmatrix} 1 & 0 & 0 \\ 0 & \cos\theta & -\sin\theta \\ 0 & \sin\theta & \cos\theta \end{bmatrix} \begin{bmatrix} \cos\psi & 0 & \sin\psi \\ 0 & 1 & 0 \\ -\sin\psi & 0 & \cos\psi \end{bmatrix} \begin{bmatrix} \cos\phi & -\sin\phi & 0 \\ \sin\phi & \cos\phi & 0 \\ 0 & 0 & 1 \end{bmatrix}$$

When the process of S14 is finished, the process moves on to S20.

In S16, the rotation matrix calculator 206 of the input device 20 calculates Euler angles θ, ψ, and φ on the basis of an acceleration.

An orientation of a gravity acceleration G is made to match a minus direction of the z axis. The rotation matrix calculator 206 of the input device 20 calculates an Euler angle θ around the x axis of the u-v-w coordinate system with respect to the x-y-z coordinate system by the following expression:

$$\theta = \sin^{-1} \frac{a_v}{G}$$

In addition, u and w components of the gravity acceleration are assumed to be au and aw, respectively. The rotation matrix calculator 206 of the input device 20 calculates an Euler angle ψ around the y axis of the u-v-w coordinate system with respect to the x-y-z coordinate system by the following expression:

$$\psi = \tan^{-1} \frac{a_u}{a_w}$$

When the process of S16 is finished, the process moves on to S18.

In S18, the rotation matrix calculator 206 of the input device 20 calculates a rotation matrix R that converts angular velocities in the u-v-w coordinate system into angular velocities in the x-y-z coordinate system on the basis of the Euler angles θ, ψ, and φ. Using these Euler angles θ, ψ, and φ, a rotation matrix R can be calculated by the expression used in S14. When the process of S18 is finished, the process moves on to S20.

In S20, the feature amount calculator 208 of the input device 20 converts angular velocities in the u-v-w coordinate system into angular velocities in the x-y-z coordinate system using the rotation matrix R. As an example, the conversion of angular velocities ωm, ωy, and ωw in the u-v-w coordinate system into angular velocities ωx, ωy, and ωz in the x-y-z coordinate system can be calculated by the following expression:

$$\begin{bmatrix} \omega_x \\ \omega_y \\ \omega_z \end{bmatrix} = R \begin{bmatrix} \omega_u \\ \omega_v \\ \omega_w \end{bmatrix}$$

When the process of S20 is finished, the process moves on to S22.

In S22, the feature amount calculator 208 of the input device 20 integrates the angular velocities, and calculates rotation angles ηx and ηz. As an example, the feature calculator 208 respectively calculates a rotation angle ηx around the x axis and a rotation angle ηz around the z axis by the following expressions:

$$\eta_x = \eta_x(0) + \sum \frac{(\omega_x(n) + \omega_x(n-1)) \cdot dt}{2}$$

$$\eta_z = \eta_z(0) + \sum \frac{(\omega_z(n) + \omega_z(n-1)) \cdot dt}{2}$$

When the process of S22 is finished, the process moves on to S24.

In S24, the command specification unit 210 of the input device 20 specifies a command on the basis of the rotation angles ηx and ηz, which are feature amounts.

As an example, the command specification unit 210 of the input device 20 selects one of "up", "down", "right", and "left" on the basis of the rotation angles ηx and ηz, as described with reference to FIG. 18. When the process of S24 is finished, the process moves on to S26.

In S26, the transmitter 212 of the input device 20 transmits the command specified in S24.

The processes as described above are performed so as to convert sensor information that is obtained from an input device that is worn on a body, a hand, or a leg, into a coordinate system that is suited to human senses, and to select a command for controlling a device, and therefore a user can operate a device in a free body position or posture.

The processes as described above enable starting a body motion in a free body position and posture, and therefore convenience is enhanced for a user. In addition, the input device 20 enables matching a natural movement of a person and an operation regardless of a start position or posture of a body motion, and therefore the learning burden on a user can be reduced. Further, the processes as described above are performed so as to provide two continuous feature amounts, and therefore the processes as described above can be applied to analog operations, such as sound volume adjustment or the movement of a pointer. In addition, in the processes as described above, an acceleration sensor is not used for purposes other than the determination of Euler angles in a reference posture, and therefore an influence of noise or inertia components by a motion can be reduced. Further, in the processes as described above, only an angular velocity sensor obtains rotation angles after the reference posture is determined, and therefore there is an advantage that the processes as described above are not influenced by rotation angles when an extreme rotation is not performed even during a translational movement of an entire body, such as normal walking.

As described above, the embodiments enable inputting operations that are suited to a user's sense of direction.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An input device that is worn on a portion of a user's body and inputs a command into a controller, the input device comprising:

a sensor that obtains angular velocities and an acceleration in a first coordinate system fixed in the input device;

a processor that performs:
  setting a second coordinate system for a reference posture of the user;
  converting the angular velocities in the first coordinate system into second angular velocities in the second coordinate system using the acceleration in the first coordinate system; and
  specifying the command on the basis of feature amounts that are calculated by using the second angular velocities; and a transmitter that transmits the command to the controller.

2. The input device according to claim 1, further comprising a switch that specifies a timing of setting the reference posture.

3. The input device according to claim 1, wherein the processor sets the reference posture when the user starts a motion.

4. The input device according to claim 1, wherein one axis of the second coordinate system matches a gravity direction.

5. The input device according to claim 1, wherein the feature amounts are calculated on the basis of a first rotation angle and a second rotation angle that correspond to rotation angles around two axes of the second coordinate system.

6. The input device according to claim 1, wherein the processor calculates the rotation matrix using Euler angles around respective axes of the first coordinate system with respect to the second coordinate system.

7. The input device according to claim 1, wherein the processor calculates amounts related to rotation angles around axes of the second coordinate system as feature amounts, using the angular velocities in the second coordinate system.

8. The input device according to claim 1, wherein the processor specifies the command by selecting one of an arbitrary number of command candidates using the feature amounts.

9. The input device according to claim 1, wherein the processor dynamically changes the number of command candidates.

10. The input device according to claim 1, wherein the portion of the user's body is one of a hand, a leg, and a neck.

11. An input method for inputting a command into a controller that is performed by a computer, the input method comprising:
  obtaining, by the computer, angular velocities and an acceleration in a first coordinate system fixed in an input device that is worn on a portion of a user's body;
  setting, by the computer, a second coordinate system for a reference posture of the user;
  converting, by the computer, the angular velocities in the first coordinate system into second angular velocities in the second coordinate system using the acceleration in the first coordinate system;
  specifying, by the computer, the command on the basis of feature amounts that are calculated by using the second angular velocities; and
  transmitting, by the computer, the command to the controller.

12. A non-transitory computer-readable recording medium having stored therein an input program for causing a computer to execute a process for inputting a command into a controller, the process comprising:
  obtaining angular velocities and an acceleration in a first coordinate system fixed in an input device that is worn on a portion of a user's body;
  setting a second coordinate system for a reference posture of the user;
  converting the angular velocities in the first coordinate system into second angular velocities in the second coordinate system using the acceleration in the first coordinate system;
  specifying the command on the basis of feature amounts that are calculated by using the second angular velocities; and
  transmitting the command to the controller.

\* \* \* \* \*